(12) United States Patent
Suh et al.

(10) Patent No.: US 10,285,091 B2
(45) Date of Patent: *May 7, 2019

(54) SYSTEM AND METHOD FOR PREAMBLES IN A WIRELESS COMMUNICATIONS NETWORK

(71) Applicant: Huawei Technologies Co., Ltd., Shenzhen (CN)

(72) Inventors: Jung Hoon Suh, Kanata (CA); Yunbo Li, Shenzhen (CN); Kwok Shum Au, Shenzhen (CN); Osama Aboul-Magd, Kanata (CA); Sheng Sun, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/643,253

(22) Filed: Jul. 6, 2017

(65) Prior Publication Data

US 2017/0311203 A1 Oct. 26, 2017

Related U.S. Application Data

(63) Continuation of application No. 14/730,728, filed on Jun. 24, 2015, now Pat. No. 9,713,031, which is a (Continued)

(51) Int. Cl.
*H04W 28/06* (2009.01)
*H04B 7/06* (2006.01)
(Continued)

(52) U.S. Cl.
CPC .......... *H04W 28/06* (2013.01); *H04B 7/0617* (2013.01); *H04B 7/0689* (2013.01);
(Continued)

(58) Field of Classification Search
CPC .... H04W 26/06; H04L 69/22; H04L 27/2613; H04L 5/0048; H04B 7/0617; H04B 7/0689

See application file for complete search history.

(56) References Cited

U.S. PATENT DOCUMENTS 7,324,605 B2   1/2008  Maltsev et al.
2005/0154957 A1 7/2005  Jacobsen
(Continued)

FOREIGN PATENT DOCUMENTS

CN   1930843 A    3/2007
CN   102474492 A  5/2012
(Continued)

OTHER PUBLICATIONS

Zhang, H., et al., "11ah Preamble for 2MHz and Beyond," IEEE 802.11-11/1483r2, Jan. 16, 2012, 24 pages.
(Continued)

*Primary Examiner* — Gary Mui
(74) *Attorney, Agent, or Firm* — Slater Matsil, LLP

(57) ABSTRACT

A method for transmitting a frame includes generating an omni portion of the frame, the omni portion including a non-beamformed long training field and a signal field, the non-beamformed long training field including channel estimation information used to decode the signal field, the non-beamformed long training field configured to be transmitted through one of multiple antennas and multiple streams. The method also includes generating a multi-stream portion of the frame, the multi-stream portion including a data field and a multi-stream long training field, the multi-stream long training field including station-specific decoding information for station-specific data in the data field. The
(Continued)

method further includes applying a beamforming indicator to the signal field of the omni portion, and transmitting the frame.

22 Claims, 11 Drawing Sheets

Related U.S. Application Data continuation of application No. 13/660,934, filed on Oct. 25, 2012, now Pat. No. 9,071,489.

(60) Provisional application No. 61/567,777, filed on Dec. 7, 2011, provisional application No. 61/576,614, filed on Dec. 16, 2011.

(51) Int. Cl.
*H04L 5/00* (2006.01)
*H04L 27/26* (2006.01)
*H04L 29/06* (2006.01)
*H04W 84/12* (2009.01)

(52) U.S. Cl.
CPC ........ *H04L 5/0048* (2013.01); *H04L 27/2613* (2013.01); *H04L 69/22* (2013.01); *H04L 5/0053* (2013.01); *H04W 84/12* (2013.01)

(56) References Cited

U.S. PATENT DOCUMENTS

| | | |
|---|---|---|
| 2010/0260159 A1 | 10/2010 | Zhang et al. |
| 2011/0096796 A1* | 4/2011 | Zhang ................. H04B 7/0669 370/474 |
| 2011/0188482 A1 | 8/2011 | Vermani et al. |
| 2012/0020261 A1 | 1/2012 | Van Zelst et al. |
| 2012/0269069 A1 | 10/2012 | Porat et al. |
| 2012/0294294 A1 | 11/2012 | Zhang |
| 2012/0327871 A1 | 12/2012 | Ghosh et al. |
| 2013/0044742 A1 | 2/2013 | Zhang et al. |
| 2013/0044743 A1* | 2/2013 | Zhang .................. H04W 28/18 370/338 |
| 2013/0114757 A1 | 5/2013 | Park et al. |
| 2013/0142095 A1 | 6/2013 | Calcev et al. |
| 2013/0142275 A1 | 6/2013 | Baik et al. |
| 2013/0177115 A1 | 7/2013 | Yang et al. |
| 2013/0235860 A1 | 9/2013 | Vermani et al. |
| 2014/0140311 A1 | 5/2014 | Lee et al. |
| 2015/0078368 A1 | 3/2015 | Vermani et al. |

FOREIGN PATENT DOCUMENTS

| | | |
|---|---|---|
| CN | 102484522 A | 5/2012 |
| WO | 2006110737 A2 | 10/2006 |
| WO | 2010116280 A1 | 10/2010 |
| WO | 2011031058 A2 | 3/2011 |

OTHER PUBLICATIONS

Park, M., "Proposed Specification Framework for TGah," IEEE P802.11 Wireless LANs, IEEE 802.11-11/1137r11, Sep. 2012, pp. 1-36.

Porat, R., et al., "Initial Proposal for TGaf PHY," IEEE 802.11-11/1544r0, Nov. 8, 2011, 19 pages.

* cited by examiner

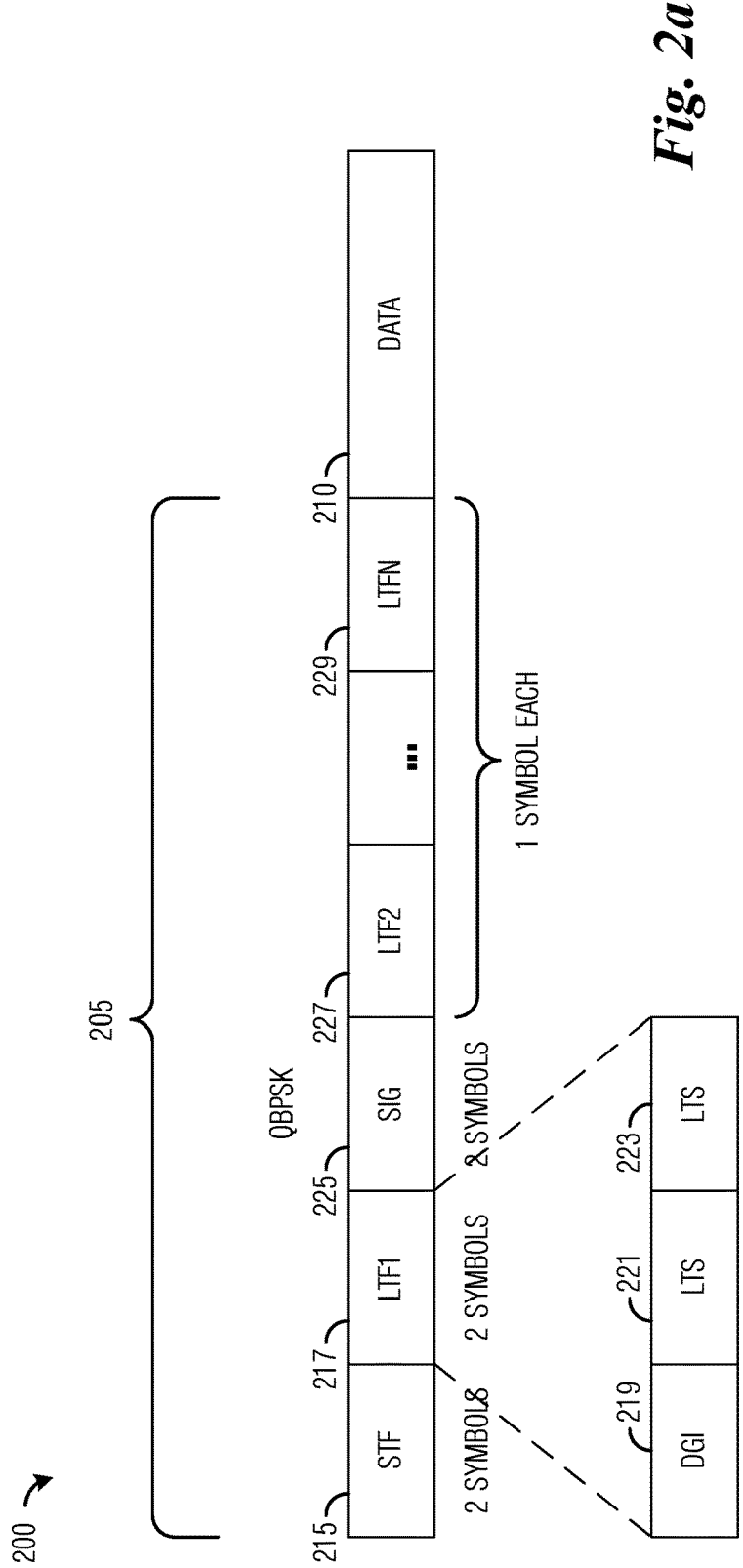

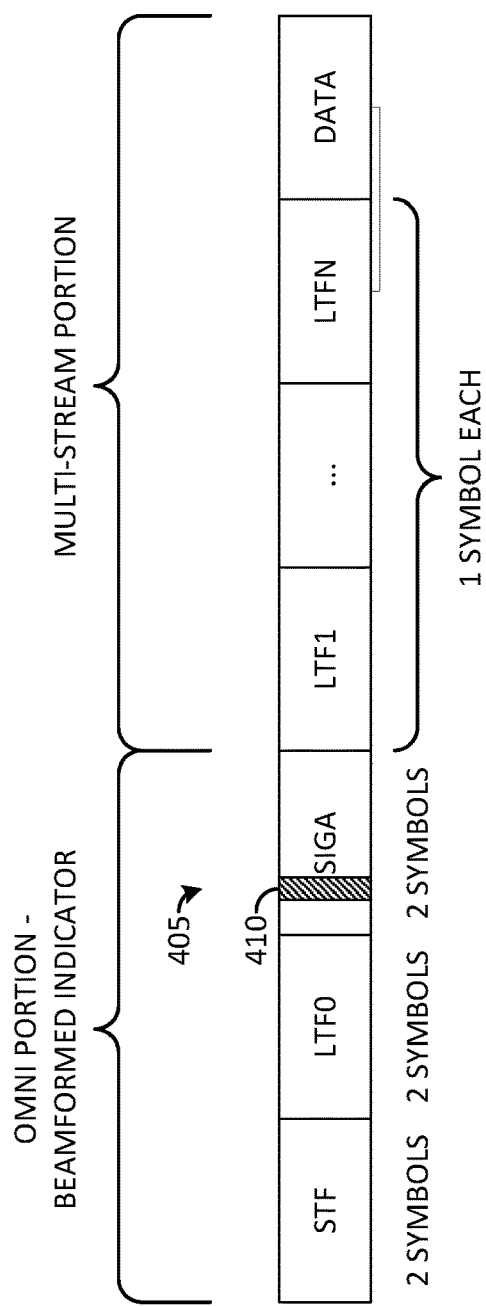

SYSTEM AND METHOD FOR PREAMBLES IN A WIRELESS COMMUNICATIONS NETWORK

CROSS-REFERENCE TO RELATED APPLICATIONS

This application is a continuation of U.S. patent application Ser. No. 14/730,728, filed Jun. 4, 2015, entitled "System and Method for Preambles in a Wireless Communications Network," which is a continuation of U.S. patent application Ser. No. 13/660,934, filed Oct. 25, 2012, (now U.S. Pat. No. 9,071,489, issued Jun. 30, 2015), entitled "System and Method for Preambles in a Wireless Communications Network," which claims the benefit of U.S. Provisional Application No. 61/567,777, filed on Dec. 7, 2011, entitled "System and Method for Single User Preamble for Wireless Local Area Networks," and U.S. Provisional Application No. 61/576,614, filed on Dec. 16, 2011, entitled "System and Method for Single User Preamble for Wireless Local Area Networks," all of which applications are hereby incorporated herein by reference.

TECHNICAL FIELD

The present disclosure relates generally to digital communications, and more particularly to a system and method for preambles in a wireless communications network.

BACKGROUND

IEEE 802.11 is a set of standards for implementing wireless local area network (WLAN). In IEEE 802.11 physical (PHY) layer frame format, the preamble part is usually composed of three fields: a short training field (STF), a long training field (LTF), and a signal field (SIG). The STF is used for coarse synchronization, automatic gain control (AGC), and the like. The LTF is used for channel estimation, fine synchronization, etc. The SIG is used to indicate the information of the frame; rate, length, and the like. As IEEE 802.11 WLAN technology evolves, a preamble design for IEEE 802.11ah is needed for its own network environment.

SUMMARY

Example embodiments of the present disclosure which provide a system and method for preambles in a wireless communications network.

In accordance with an example embodiment of the present disclosure, a method for method for transmitting a frame is provided. The method includes generating, by an access point, an omni portion of the frame, the omni portion including a non-beamformed long training field and a signal field, the non-beamformed long training field including channel estimation information used to decode the signal field, the non-beamformed long training field configured to be transmitted through one of multiple antennas and multiple streams. The method also includes generating, by the access point, a multi-stream portion of the frame, the multi-stream portion including a data field and a multi-stream long training field, the multi-stream long training field including station-specific decoding information for station-specific data in the data field. The method further includes applying, by the access point, a beamforming indicator to the signal field of the omni portion, and transmitting, by the access point, the frame.

In accordance with another example embodiment of the present disclosure, a method for receiving a frame is provided. The method includes receiving, by a station, an omni portion of the frame, the omni portion includes a non-beamformed long training field and a signal field, the non-beamformed long training field including channel estimation information used to decode the signal field. The method also includes determining, by the station, a beamform status of a multi-stream portion of the frame, and receiving, by the station, the multi-stream portion of the frame, the multi-stream portion including a multi-stream long training field and a data field, the multi-stream long training field including station-specific decoding information for station-specific data in the data field. The method further includes decoding, by the station, the multi-stream portion of the frame using a technique commensurate with the beamform status of the multi-stream portion of the frame.

In accordance with another example embodiment of the present disclosure, a transmitting device is provided. The transmitting device includes a processor, and a transmitter operatively coupled to the processor. The processor generates an omni portion of a frame, the omni portion including a non-beamformed long training field and a signal field, the non-beamformed long training field including channel estimation information used to decode the signal field, the non-beamformed long training field to be transmitted through one of multiple antennas and multiple streams. The processor generates a multi-stream portion of the frame, the multi-stream portion including a data field and a multi-stream long training field, the multi-stream long training field including station-specific decoding information for station-specific data in the data field, and applies a beamforming indicator to the signal field of the omni portion. The transmitter transmits the frame.

In accordance with another example embodiment of the present disclosure, a receiving device is provided. The receiving device includes a receiver, and a processor operatively coupled to the receiver. The receiver receives an omni portion of a frame, the omni portion includes a non-beamformed long training field and a signal field, the non-beamformed long training field including channel estimation information used to decode the signal field, and receives a multi-stream portion of the frame, the multi-stream portion including a multi-stream long training field and a data field, the multi-stream long training field including station-specific decoding information for station-specific data in the data field. The processor determines a beamform status of the multi-stream portion of the frame, and decodes the multi-stream portion of the frame using a technique commensurate with the beamform status of the multi-stream portion of the frame.

One advantage of an embodiment is that the preamble supports beamforming and/or non-beamforming while allowing non-destination stations, e.g., non-intended recipients, to decode at least a portion of the preamble. The ability of the non-destination stations to decode a portion of the preamble may help to improve the overall performance of the non-destination stations and the overall wireless communications network.

A further advantage of an embodiment is that a source of the preamble may be able to use beamforming to transmit to a destination station, e.g., an intended recipient, to improve transmission performance.

BRIEF DESCRIPTION OF THE DRAWINGS

For a more complete understanding of the present disclosure, and the advantages thereof, reference is now made to the following descriptions taken in conjunction with the accompanying drawing, in which:

FIGS. 2a and 2b illustrate example PHY frames according to example embodiments described herein;

FIGS. 4a and 4b illustrate example PHY frames, wherein the PHY frames include beamforming indicators according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to preambles. For example, at a transmitting device, the transmitting device generates an omni portion of a frame, the omni portion including a non-beamformed long training field and a signal field, the non-beamformed long training field including channel estimation information used to decode the signal field, the non-beamformed long training field configured to be transmitted through one of multiple streams and multiple antennas. The transmitting device also generates a multi-stream portion of the frame, the multi-stream portion including a data field and a multi-stream long training field, the multi-stream long training field including station-specific decoding information for station-specific data in the data field. The transmitting device further applies a beamforming indicator to the signal field of the omni portion, and transmits the frame. As another example, at a receiving device, the receiving device receives an omni portion of a frame, the omni portion includes a non-beamformed long training field located before a signal field, the non-beamformed long training field including channel estimation information used to decode the signal field. The receiving device receives a multi-stream portion of the frame, the multi-stream portion including a multi-stream long training field and a data field, the multi-stream long training field including station-specific decoding information for station-specific data in the data field. The receiving device also determines a beamform status, e.g., beamformed or non-beamformed, of the multi-stream portion of the frame, and decodes the multi-stream portion of the frame using a technique commensurate with the beamform status of the multi-stream portion of the frame.

The present disclosure will be described with respect to example embodiments in a specific context, namely an IEEE 802.11ah compliant wireless communications network that supports beamforming. The disclosure may also be applied, however, to other standards compliant and non-standards compliant communications systems that support beamformed and non-beamformed transmissions.

Figure 1:
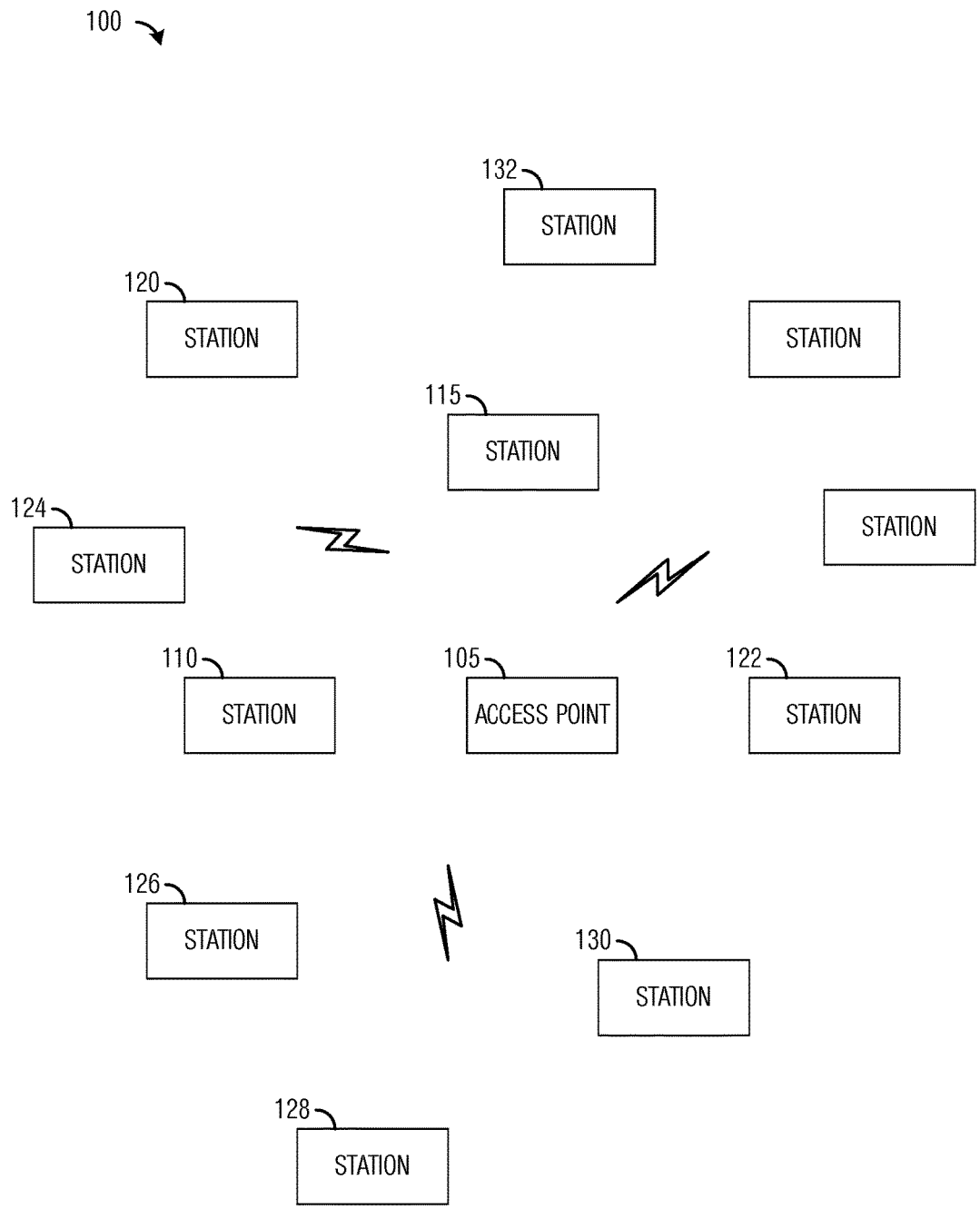
FIG. 1 illustrates an example communications network according to example embodiments described herein.

FIG. 1 illustrates a communications network 100. Communications network 100 may be IEEE 802.11ah compliant. Communications network 100 includes an access point 105, which serves a plurality of stations, such as stations 110-132. The plurality of stations may include communications devices, such as cellular telephones, smart telephones, personal digital assistants, and the like, computers, such as PCs, laptops, tablets, printers, scanners, and the like, media devices, such as televisions, music players, video displays, media distribution centers, and the like, sensor devices, such as weather sensor, fire sensors, medical sensors, auto sensors, security sensors, and the like.

In a single user scenario, access point 105 may transmit to a single station, e.g., a destination station. However, other stations, e.g., non-destination stations, served by access point 105 may also receive the transmission and attempt to decode at least a portion of the transmission. Information determined by the non-destination stations in decoding the transmission not intended for them may help to improve the overall performance of communications network 100.

Some of the stations served by access point 105 have relatively high data requirements, such as the communications devices, and the computers, while others may have small data requirements, such as the sensor devices. The stations having high data requirements may benefit from advanced transmission techniques, such as beamforming, multiple antenna technology, and the like. The stations having low data requirements may not benefit from such advanced transmission techniques. Furthermore, many of the stations with low data requirements are also power limited and typical processing requirements involved with the advanced transmission techniques may severely tax power consumption limits of these devices and shorten their battery life.

In IEEE 802.11 WLAN, a preamble is appended in a signal frame of the IEEE 802.11 WLAN physical layer. The preamble is composed of short training fields (STFs), long training fields (LTFs), and signal (SIG) fields, which provide synchronization, channel estimation functionalities, and contain information such as the rate and the length of the frame. As IEEE 802.11 WLAN evolves with multi-antenna technologies, these preamble formats have changed accordingly. A beamforming steering matrix may also be applied to the preambles as well as data field. However, some information in the SIG field is needed by all stations operating in the IEEE 802.11 network, which may make it harder to beamform the preamble since it may be difficult for stations that are not the intended recipient of the transmission (i.e., the preamble) to decode the transmission.

FIG. 2a illustrates a first physical layer (PHY) frame 200. PHY frame 200 may be used in a single user, 2 MHz or greater bandwidth scenario. PHY frame 200 includes a preamble 205 and a data region 210. Preamble 205 includes a STF 215, and a first LTF (LTF1) 217 that comprises a double guard interval (DGI) 219, a first long training sequence (LTS) 221, and a second LTS 223. PHY frame 200 also includes a SIG field 225, and a plurality of N-1 LTFs (LTF2-LTFN) 227-229, where N is a number of spatial streams. Spatial mapping is used in the LTFs of PHY frame 200. LTF1 217 may be two symbols long and is located before SIG field 225. LTF2-LTFN 227-229 may be one symbol each and located after SIG field 225.

Figure 2B:
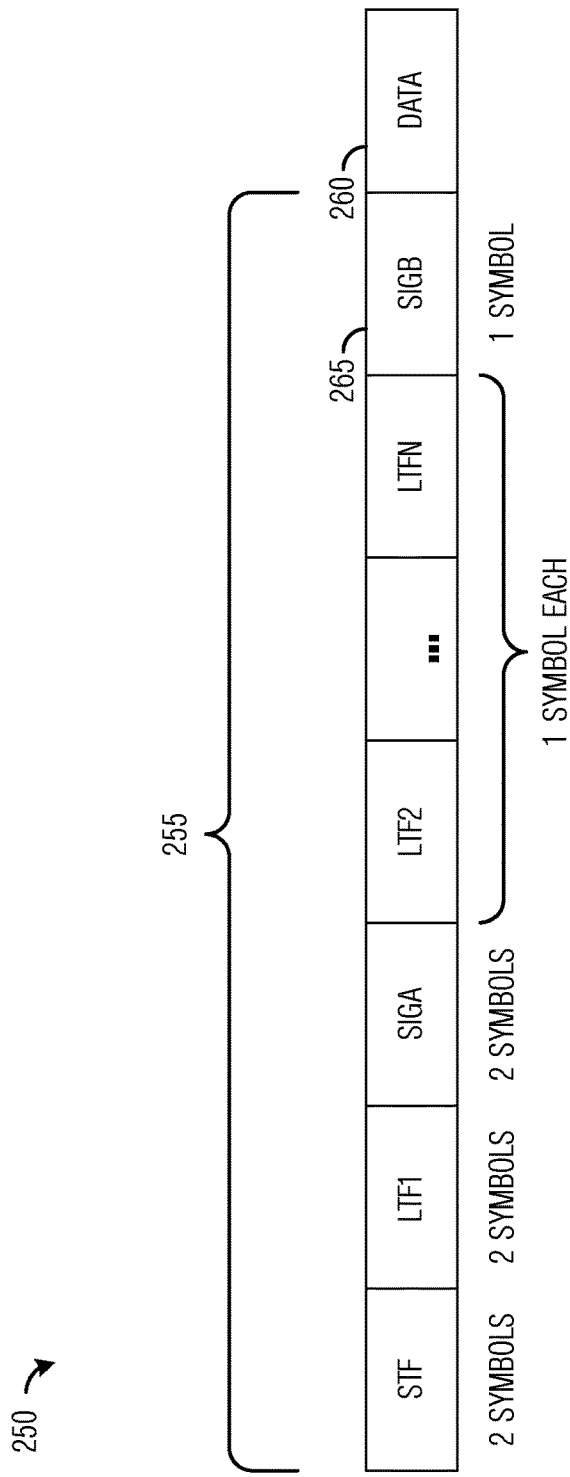

In general, spatial mapping has four categories: direct mapping, indirect mapping, spatial expansion, and beamforming. LTF1 217 and LTF2-LTFN 227-229 may use a single spatial mapping method. Therefore, as shown in FIG. 2*a*, the LTFs of PHY frame 200 may be non-beamformed or beamformed. It is noted that if LTF1 217 is beamformed, non-destination stations may fail to decode SIG field 225. However, some of the content of PHY frame 200 may be needed by all stations, not just the destination station. FIG. 2*b* illustrates a second PHY frame 250. PHY frame 250 may be similar to PHY frame 200 with a second SIG field (SIGB) 265. As with PHY frame 200, PHY frame 250 may be non-beamformed or beamformed.

It may be possible to separate a PHY frame into multiple portions, with a first portion being a non-beamformed portion easily decoded by all stations and a second portion that is capable of being beamformed or non-beamformed, depending on performance requirements and/or capabilities of the destination station. The first and non-beamformed portion may contain information usable by all stations, while the second and possibly beamformed portion may contain information intended for the destination station.

Figure 3A:
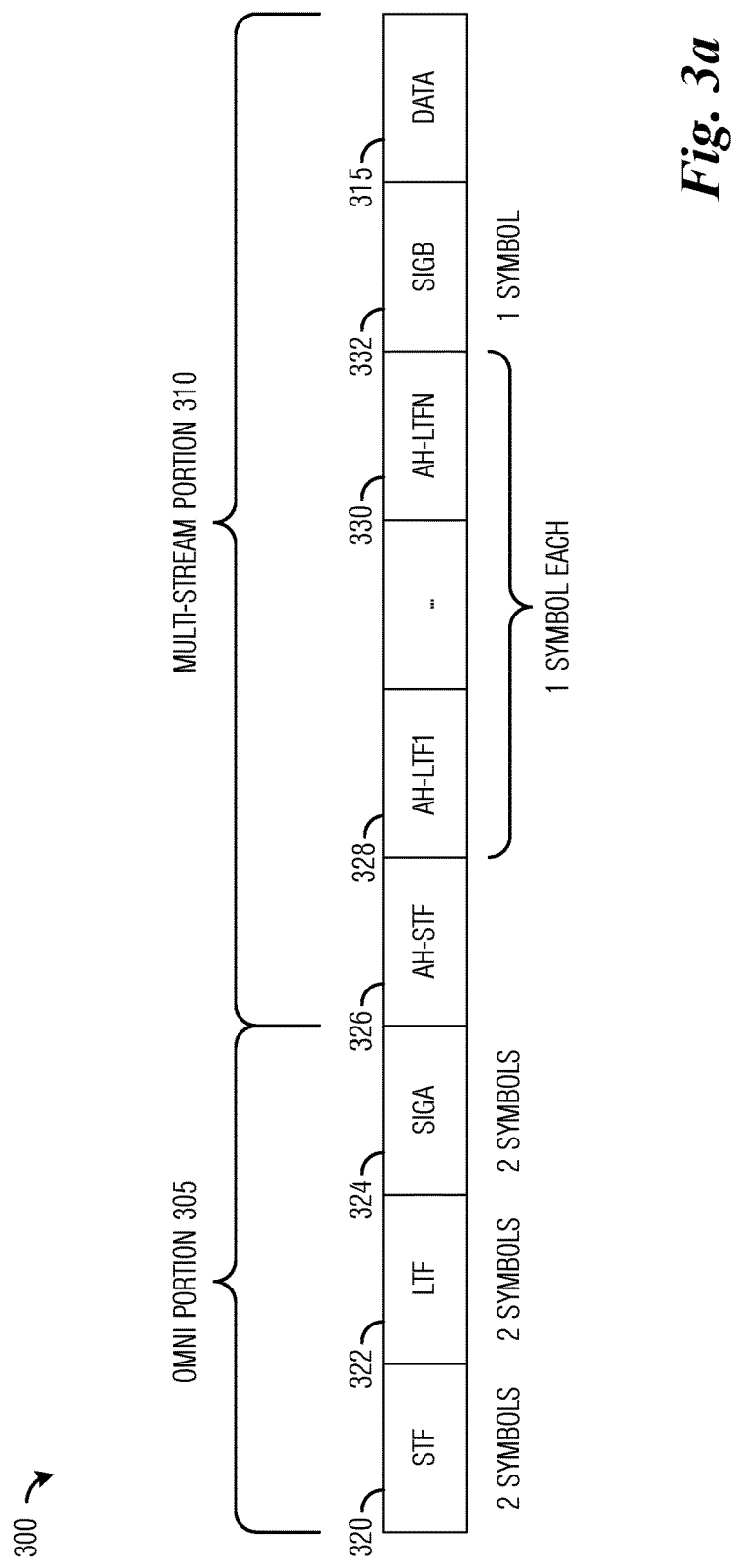
FIGS. 3a and 3b illustrate example PHY frames, wherein the PHY frames are separated into multiple portions according to example embodiments described herein.

FIG. 3*a* illustrates a third PHY frame 300, wherein PHY frame 300 is separated into multiple portions. PHY frame 300 includes an omni portion 305 that is non-beamformed and may be decoded by all stations, and a multi-stream portion 310 that may or may not be beamformed. If non-beamformed, multi-stream portion 310 may be decoded by all stations. If beamformed, multi-stream portion 310 may be difficult to decode by stations other than the destination station. It is noted that multi-stream portion 310 may include a data portion 315 of PHY frame 300.

Omni portion 305 may include a STF 320, a LTF 322, and a first SIG field (SIGA) 324. Since omni portion 305 is non-beamformed, all stations may decode it, and LTF 322 may be used to help in the decoding of SIGA 324. Multi-stream portion 310 may include its own STF (AH-STF) 326, a plurality of N LTFs (AH-LTF1-AH-LTFN) 328-330, and a second SIG field (SIGB) 332. Content of multi-stream portion 310 may be intended for exclusive use of the destination station. AH-LTF1-AH-LTFN 328-330 may be used by the destination station to help in the decoding of SIGB 332 and/or data portion 315.

Figure 3B:
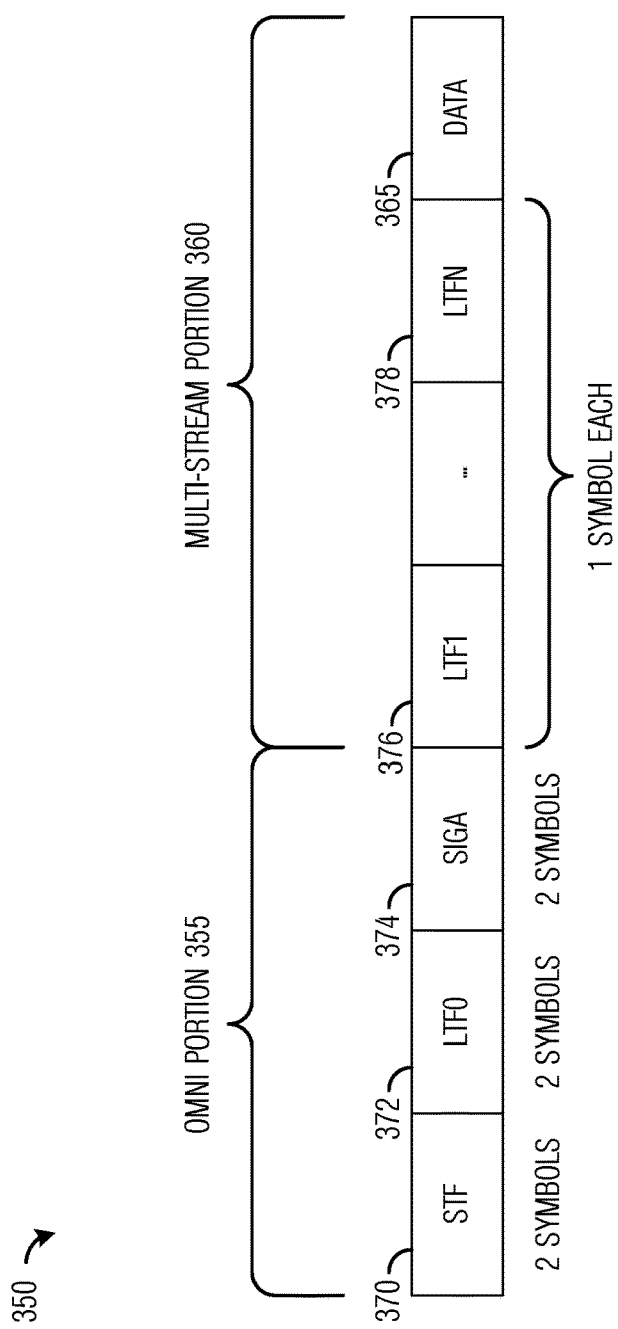

FIG. 3*b* illustrates a fourth PHY frame 350, wherein PHY frame 350 is separated into multiple portions. PHY frame 350 includes an omni portion 355 that is non-beamformed and may be decoded by all stations, and a multi-stream portion 360 that may or may not be beamformed. It is noted that multi-stream portion 360 may include a data portion 365 of PHY frame 350.

Omni portion 355 may include a STF 370, a LTF (LTF0) 372, and a SIG field (SIGA) 374. Since omni portion 355 is non-beamformed, all stations may decode it, and LTF 372 may be used to help in the decoding of SIGA 374. Multi-stream portion 360 may include a plurality of N LTFs (LTF1-LTFN) 376-378. Content of multi-stream portion 360 may be intended for exclusive use of the destination station. LTF1-LTFN 376-378 may be used by the destination station to help in the decoding of data portion 365.

It is noted that since the multi-stream portion, e.g., multi-stream portion 310 and/or multi-stream portion 360, may or may not be beamformed, the destination station may need to know a beamform status of the multi-stream portion. A beamforming indicator may be used to indicate the beamform status of the multi-stream portion.

Figure 4B:
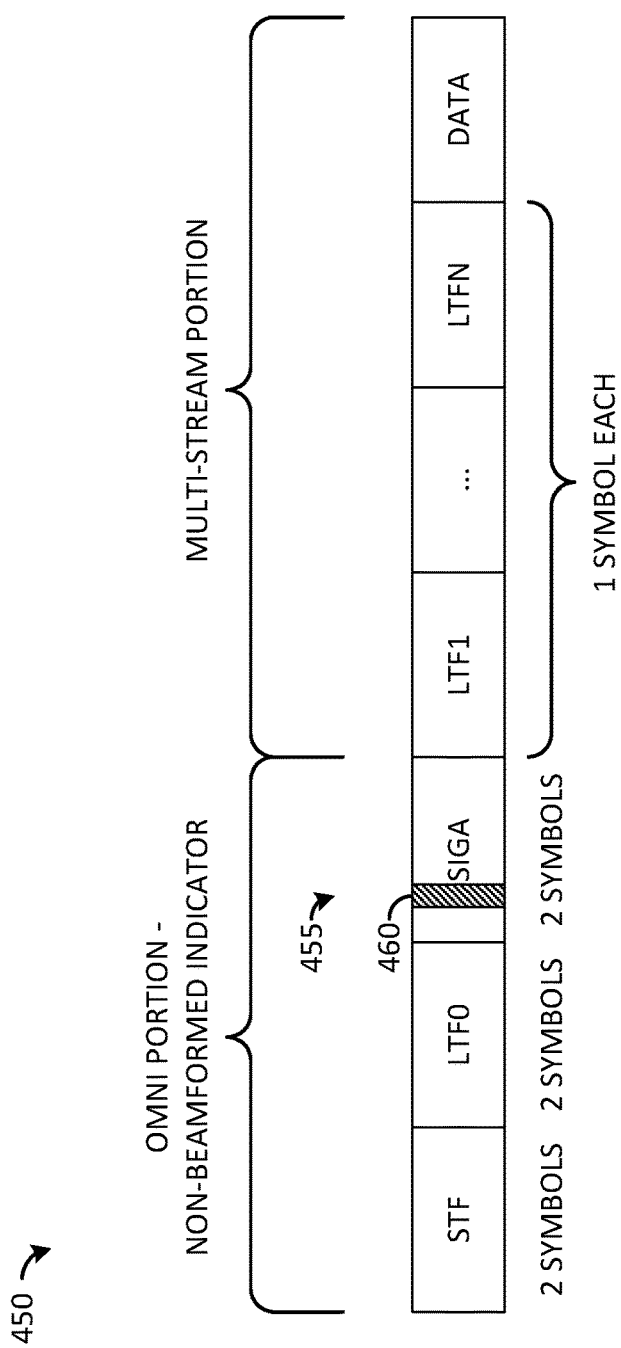

According to an example embodiment, a beamforming indicator located in a SIG field of an omni portion of a PHY frame may be used to indicate the beamform status of the multi-stream portion of the PHY frame. As an example, a bit or multiple bits of the SIG field may be used as the beamforming indicator. As an example, the beamforming indicator located in the SIG field may be set to a first value, e.g., a 1, to indicate that the multi-stream portion is beamformed. As an example, the beamforming indicator located in the SIG field may be set to a second value, e.g., a 0, to indicate that the multi-stream portion is non-beamformed. FIG. 4*a* illustrates a PHY frame 400 wherein a beamforming indicator 410 of a SIG field 405 set to a first value indicates that a multi-stream portion of PHY frame 400 is beamformed. FIG. 4*b* illustrates a PHY frame 450 wherein a beamforming indicator 460 of a SIG field 455 set to a second value indicates that a multi-stream portion of PHY frame 450 is non-beamformed.

As an illustrative example, in an IEEE 802.11ah compliant communications system, if the beamforming indicator is set to a value of 1, a Q matrix is changed, while if the beamforming indicator is set to a value of 0, the Q matrix is unchanged. It is noted that the values may be reversed.

According to another example embodiment, signal intensity may be used to indicate the beamform status of the multi-stream portion of the PHY frame. Intensity detection may be used to detect signal intensity at different axes to detect the value of the beamforming indicator. As an example, either binary phase shift keying (BPSK) or quadrature binary phase shift keying (QBPSK) modulation may be employed in the SIG field or part of the SIG field to indicate the value of the beamforming indicator. As an example, BPSK may be used to indicate that the multi-stream portion is beamformed and QBPSK may be used to indicate that the multi-stream portion is non-beamformed.

Figure 5A:
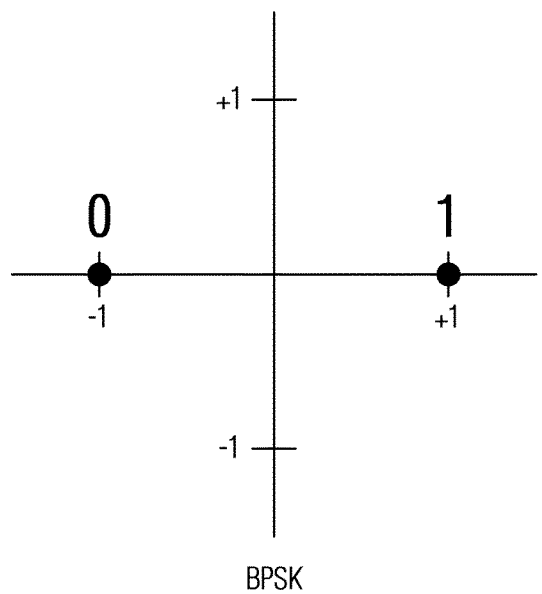
FIGS. 5a and 5b illustrate example constellation diagrams of BPSK and QBPSK, respectively according to example embodiments described herein.
Figure 5B:
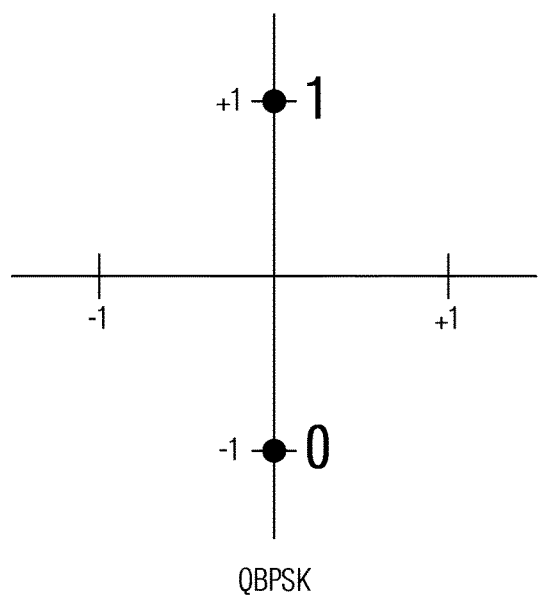

FIGS. 5*a* and 5*b* illustrate a constellation diagram of BPSK and QBPSK, respectively. Intensity detection may use intensity of signal(s) at different axes to detect the beamforming indicator. It is noted that the I and/or Q axes are used as an illustrative examples. Consider $|E_I|^2$ and $|E_Q|^2$ as the signal intensity in the I and Q axes, respectively, where E is a complex number representing the signal intensity of the received signal, and $E_I$ and $E_Q$ are the real and imaginary parts of E, respectively. There may be different intensity distributions for different modulations. For BPSK, $|E_I|^2$ is positive and $|E_Q|^2$ is zero. For QBPSK, $|E_I|^2$ is zero and $|E_Q|^2$ is positive. As an example of using intensity detection for indicating beamform status of the multi-stream portion, consider the following: Let BPSK be used for either the SIG field or part of the SIG field to indicate a beamformed multi-stream portion, and QBPSK be used for either the SIG field or part of the SIG field to indicate a non-beamformed multi-stream portion. It is noted that the opposite designations may be used as well. After the destination station receives the SIG field, it can deduce the modulation type through a criterion, such as $|E_I|^2-|E_Q|^2$. If $|E_I|^2-|E_Q|^2>0$, it means BPSK is used in the SIG field or a portion of the SIG field and the multi-stream portion is beamformed. If $|E_I|^2-|E_Q|^2<0$, it means QBPSK is used in the SIG field or a portion of the SIG field and the multi-stream portion is non-beamformed. Other modulation techniques, such as higher level modulations, and/or different criteria can also be used in intensity detection.

Table 1 illustrates a feature comparison chart, where HT-MM is an IEEE 802.11n mixed-mode preamble, Q is the beamforming steering matrix, D is the cyclic delay diversity (CDD), and P is the orthogonal mapping matrix.

TABLE 1

Feature Comparison Chart.

|  | Q | D | P |
|---|---|---|---|
| HT-MM | NO | YES | NO |
| Existing 802.11ah Preamble | YES | YES | YES |
| Example Embodiments | YES | YES | YES |

Figure 6:
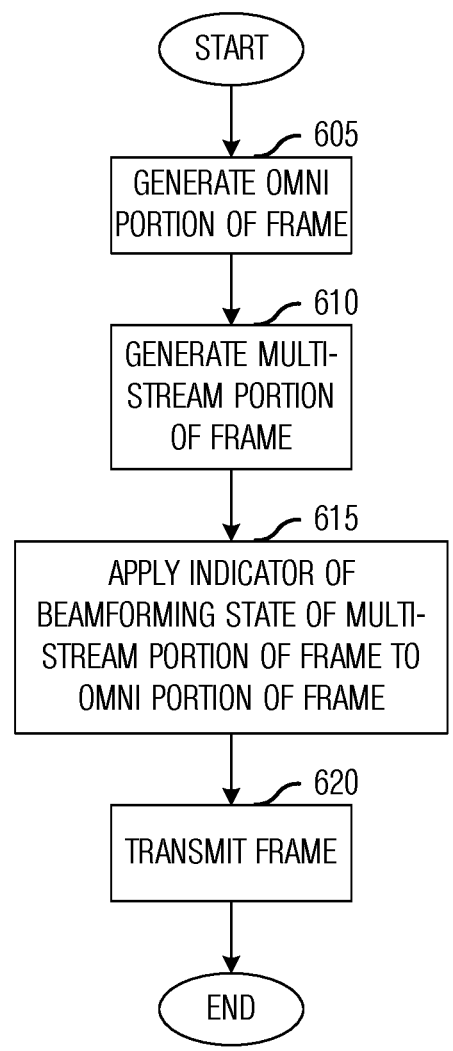
FIG. 6 illustrates an example flow diagram of operations in transmitting a PHY frame according to example embodiments described herein.

FIG. 6 illustrates a flow diagram of operations 600 in transmitting a PHY frame. Operations 600 may be indicative of operations occurring in a transmitting device, e.g., an access point, such as access point 105, as the access point transmits a PHY frame to a destination station. The PHY frame includes multiple portions, with an omni portion that is not beamformed and is decodable by all stations and a multi-stream portion that may or may not be beamformed intended for a destination station.

Operations 600 may begin with the access point generating an omni portion of the PHY frame (block 605). The omni portion of the PHY frame may include a non-beamformed LTF and SIG field, with the non-beamformed LTF including channel estimation information used to decode the signal field. The non-beamformed LTF may be transmitted over a single space time stream.

The access point may generate a multi-stream portion of the PHY frame (block 610). The multi-stream portion may include a multi-stream LTF and a data field and is intended for a destination station. The multi-stream LTF may contain station-specific decoding information for use by the destination station. The multi-stream portion may or may not be beamformed.

The access point may apply a beamforming indicator to the SIG field of the omni portion of the PHY frame (block 615). According to an example embodiment, applying the beamforming indicator may include setting one or more bits in the SIG field of the omni portion of the PHY frame to a value corresponding to a beamform status of the multi-stream portion of the PHY frame. As an example, the bit(s) may be set to a first value if the multi-stream portion is beamformed and a second value if the multi-stream portion is non-beamformed. According to another example embodiment, applying the beamforming indicator may include applying a modulation technique commensurate with the beamform status of the multi-stream portion of the PHY frame to the SIG field or a portion of the SIG field. As an example, a BPSK modulation technique may be applied to the SIG field or a portion thereof if the multi-stream portion is beamformed and a QBPSK modulation technique may be applied to the SIG field or a portion thereof if the multi-stream portion is non-beamformed. The PHY frame may be transmitted (block 620).

Figure 7:
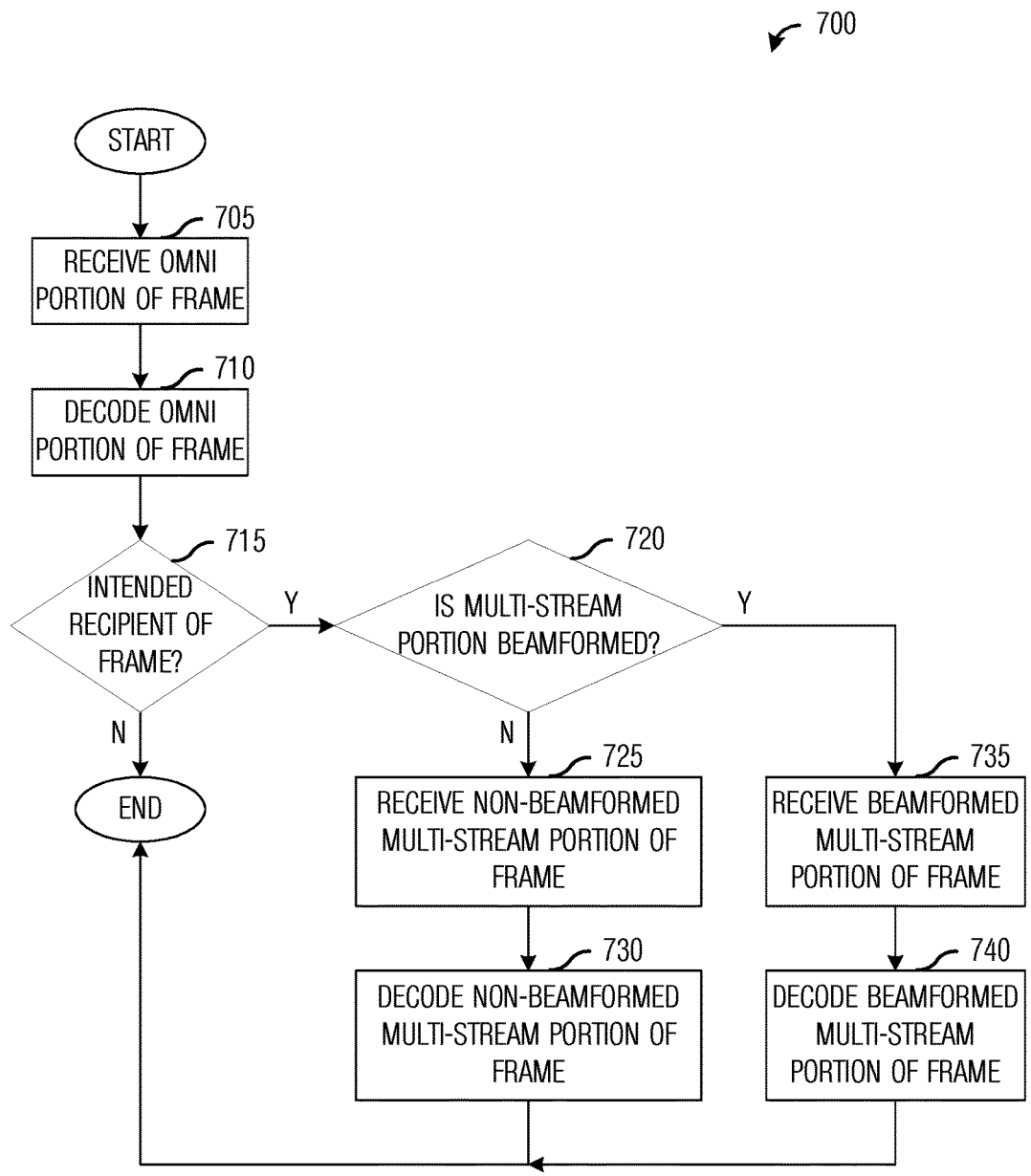
FIG. 7 illustrates an example flow diagram of operations in receiving a PHY frame according to example embodiments described herein.

FIG. 7 illustrates a flow diagram of operations 700 in receiving a PHY frame. Operations 700 may be indicative of operations occurring in a receiving device, e.g., a station, such as a destination station, as the station receives a PHY frame from an access point. The PHY frame includes multiple portions, with an omni portion that is not beamformed and is decodable by all stations and a multi-stream portion that may or may not be beamformed intended for the destination station.

Operations 700 may begin with the station receiving an omni portion of the PHY frame (block 705). Since the omni portion is non-beamformed, the station may be able to decode the omni portion of the PHY frame (block 710). The station may use a LTF in the omni portion of the PHY frame to help it decode a SIG field. The station may perform a check to determine if it is the destination station of the omni portion (as well as a subsequent multi-stream portion) (block 715). If the station is not the destination station, the station may stop with the decoding of the omni portion of the PHY frame.

If the station is the destination station, the station may perform a check to determine if the multi-stream portion is beamformed, i.e., the station determines the beamform status of the multi-stream portion of the PHY frame (block 720). As discussed previously, the station may determine the beamform status of the multi-stream portion by examining a beamforming indicator. The beamforming indicator may be in the form of one or more bits in the SIG field of the omni portion. The beamforming indicator may also be in the form of a modulation technique used for the SIG field or a portion of the SIG field.

If the multi-stream portion is not beamformed, the station may receive the non-beamformed multi-stream portion (block 725) and decode the non-beamformed multi-stream portion (block 730). If the multi-stream portion is beamformed, the station may receive the beamformed multi-stream portion (block 735) and decode the beamformed multi-stream portion (block 740).

Figure 8:
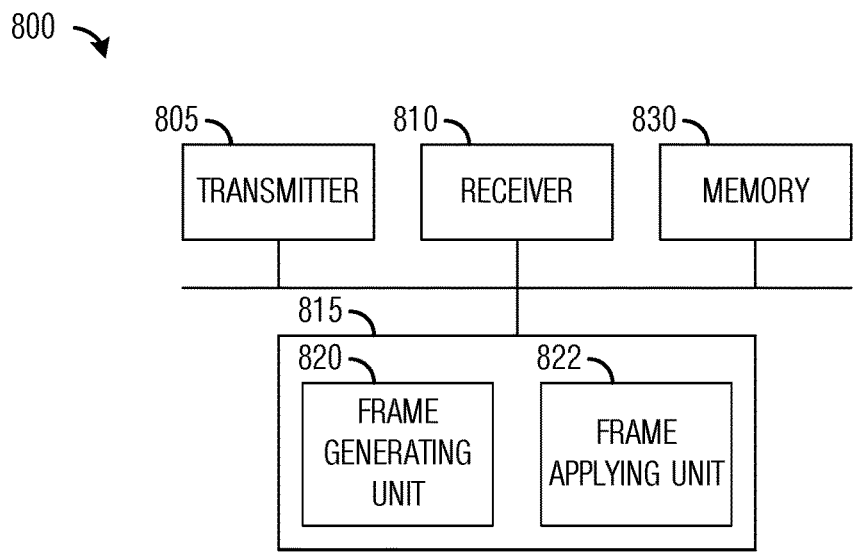
FIG. 8 illustrates an example diagram of a first communications device according to example embodiments described herein.

FIG. 8 illustrates a diagram of a first communications device 800. Communications device 800 may be an implementation of an access point (or more generally, a transmitting device) of a communications system. Communications device 800 may be used to implement various ones of the embodiments discussed herein. As shown in FIG. 8, a transmitter 805 is configured to send messages, and the like, and a receiver 810 is configured to receive messages, and the like. Transmitter 805 and receiver 810 may have a wireless interface, a wireline interface, or a combination thereof.

A frame generating unit 820 is configured to generate a PHY frame, which includes an omni portion and a multi-stream portion. The omni portion includes a beamforming indicator of the beamform status of the multi-stream portion. A frame applying unit 822 is configured to apply the beamforming indicator to the omni portion. Frame applying unit 822 may set one or more bits in a SIG field in the omni portion to indicate the beamform status of the multi-stream portion or apply a modulation technique commensurate to the beamform status of the multi-stream portion to the SIG field or a portion thereof. A memory 830 is configured to store PHY frames, beamform status, beamforming indicators, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, transmitter 805 and receiver 810 may be implemented as a specific hardware block, while frame generating unit 820 and frame applying unit 822 may be software modules executing in a processor 815, such as a microprocessor, a digital signal processor, a custom circuit, or a custom compiled logic array of a field programmable logic array. Additionally, frame generating unit 820 and frame applying unit 822 may be software modules stored in memory 830.

Figure 9:
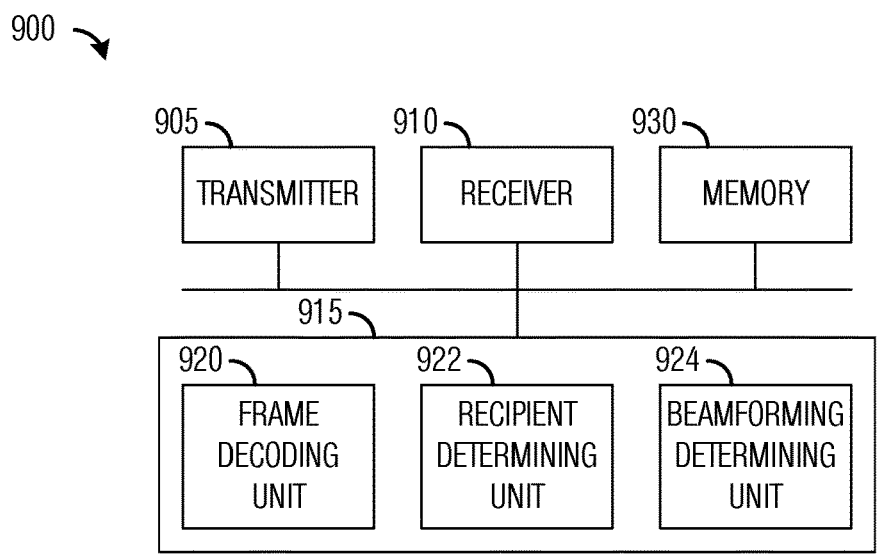
FIG. 9 illustrates an example diagram of a second communications device according to example embodiments described herein.

FIG. 9 illustrates a diagram of a second communications device 900. Communications device 900 may be an implementation of station (or more generally, a receiving device) of a communications system. Communications device 900 may be used to implement various ones of the embodiments discussed herein. As shown in FIG. 9, a transmitter 905 is configured to send messages, and the like, and a receiver 910 is configured to receive messages, and the like. Transmitter 905 and receiver 910 may have a wireless interface, a wireline interface, or a combination thereof.

A frame decoding unit 920 is configured to decode a frame or a portion of a frame. A recipient determining unit 922 is configured to determine if communications device 900 to determine if it is the destination station of the frame. A beamforming determining unit 924 is configured to determine if a frame is beamformed, i.e., determines the beamform status of the frame. Beamforming determining unit 924 determines the beamform status by examining a beamforming indicator, which may be in the form of one or more bits of a frame or a modulation technique used to modulate a field or a portion thereof. A memory 930 is configured to store frames, beamform status, beamforming indicators, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, transmitter 905 and receiver 910 may be implemented as a specific hardware block, while frame decoding unit 920, recipient determining unit 922, and beamforming determining unit 924 may be software modules executing in a processor 915, such as a microprocessor, a digital signal processor, a custom circuit, or a custom compiled logic array of a field programmable logic array. Additionally, frame decoding unit 920, recipient determining unit 922, and beamforming determining unit 924 may be software modules stored in memory 930.

Although the present disclosure and its advantages have been described in detail, it should be understood that various changes, substitutions and alterations can be made herein without departing from the spirit and scope of the disclosure as defined by the appended claims.

What is claimed is:

1. A method for transmitting a frame, the method comprising:
generating, by an access point, an omni portion of the frame, the omni portion including a signal field, and the signal field including a beam forming field indicating whether a Q matrix is changed from the omni portion of the frame to a multi-stream portion of the frame;
generating, by the access point, the multi-stream portion of the frame in accordance with a value of the beam forming field, the multi-stream portion of the frame having N spatial streams, the multi-stream portion of the frame containing N−1 long training fields and including a data field, and the multi-stream portion of the frame being located after the omni portion of the frame; and
wirelessly transmitting, by the access point, the frame.

2. The method of claim 1, wherein the omni portion further includes a short training field and a first long training field, and wherein the first long training field includes channel estimation information for decoding the signal field.

3. The method of claim 1, wherein the multi-stream portion further includes a second long training field comprising reference signal information for channel estimation of station-specific data in the data field.

4. The method of claim 1, further comprising setting the beam forming field to a first value indicating the Q matrix is changed from the omni portion of the frame to the multi-stream portion of the frame.

5. The method of claim 1, further comprising setting the beam forming field to a second value indicating the Q matrix is not changed from the omni portion of the frame to the multi-stream portion of the frame.

6. The method of claim 1, wherein transmitting the frame comprises:
transmitting the omni portion of the frame through one stream; and
transmitting the multi-stream portion of the frame through multiple antennas and multiple streams.

7. A method for receiving a frame, the method comprising:
wirelessly receiving, by a station, an omni portion of the frame, the omni portion including a signal field, and the signal field including a beam forming field indicating whether a Q matrix is changed from the omni portion of the frame to a multi-stream portion of the frame;
decoding, by the station, the beam forming field;
wirelessly receiving, by the station, the multi-stream portion of the frame, the multi-stream portion of the frame having N spatial streams, the multi-stream portion containing N−1 long training fields and including a data field, and the multi-stream portion of the frame being located after the omni portion of the frame; and
decoding, by the station, the multi-stream portion of the frame in accordance with the decoded beam forming field.

8. The method of claim 7, wherein the omni portion further includes a short training field and a first long training field, and wherein the first long training field includes channel estimation information for decoding the signal field.

9. The method of claim 7, wherein the multi-stream portion further includes a second long training field comprising reference signal information for channel estimation of station-specific data in the data field.

10. The method of claim 7, wherein decoding the beam forming field comprises determining the beam forming field has a first value indicating the Q matrix is changed from the omni portion of the frame to the multi-stream portion of the frame.

11. The method of claim 7, wherein decoding the beam forming field comprises determining the beam forming field has a second value indicating the Q matrix is not changed from the omni portion of the frame to the multi-stream portion of the frame.

12. An access point comprising:
a processor configured to:
generate an omni portion of a frame, wherein the omni portion includes a signal field, and wherein the signal field includes a beam forming field indicating whether a Q matrix is changed from the omni portion of the frame to a multi-stream portion of the frame;
generate the multi-stream portion of the frame in accordance with a value of the beam forming field, wherein the multi-stream portion of the frame has N spatial streams, wherein the multi-stream portion of the frame contains N−1 long training fields and includes a data field, and wherein the multi-stream portion of the frame is located after the omni portion of the frame; and a transmitter coupled to the processor and configured to wirelessly transmit the frame.

13. The access point of claim 12, wherein the omni portion further includes a short training field and a first long training field, and wherein the first long training field includes channel estimation information for decoding the signal field.

14. The access point of claim 12, wherein the multi-stream portion further includes a second long training field comprising reference signal information for channel estimation of station-specific data in the data field.

15. The access point of claim 12, wherein the processor is further configured to set the beam forming field to a first value indicating the Q matrix is changed from the omni portion of the frame to the multi-stream portion of the frame.

16. The access point of claim 12, wherein the processor is further configured to set the beam forming field to a second value indicating the Q matrix is not changed from the omni portion of the frame to the multi-stream portion of the frame.

17. The access point of claim 12, wherein the transmitter configured to transmit the frame comprises:

transmit the omni portion of the frame through one stream; and transmit the multi-stream portion of the frame through multiple antennas and multiple streams.

18. A station comprising:

a receiver configured to wirelessly receive an omni portion of a frame, wherein the omni portion includes a signal field, and wherein the signal field includes a beam forming field indicating whether a Q matrix is changed from the omni portion of the frame to a multi-stream portion of the frame;

a processor coupled to the receiver and configured to decode the beam forming field;

the receiver further configured to wirelessly receive the multi-stream portion of the frame, wherein the multi-stream portion of the frame has N spatial streams, wherein the multi-stream portion contains N−1 long training fields and includes a data field, and wherein the multi-stream portion of the frame is located after the omni portion of the frame; and the processor further configured to decode the multi-stream portion of the frame in accordance with the decoded beam forming field.

19. The receiver of claim 18, wherein the omni portion further includes a short training field and a first long training field, and wherein the first long training field includes channel estimation information for decoding the signal field.

20. The receiver of claim 18, wherein the multi-stream portion further includes a second long training field comprising reference signal information for channel estimation of station-specific data in the data field.

21. The station of claim 18, wherein the processor configured to decode the beam forming field comprises the processor configured to determine the beam forming field has a first value indicating the Q matrix is changed from the omni portion of the frame to the multi-stream portion of the frame.

22. The station of claim 18, wherein the processor configured to determine the beam forming field has a second value indicating the Q matrix is not changed from the omni portion of the frame to the multi-stream portion of the frame.

* * * * *

UNITED STATES PATENT AND TRADEMARK OFFICE
CERTIFICATE OF CORRECTION

PATENT NO. : 10,285,091 B2
APPLICATION NO. : 15/643253
DATED : May 7, 2019
INVENTOR(S) : Jung Hoon Suh et al.

Page 1 of 1

It is certified that error appears in the above-identified patent and that said Letters Patent is hereby corrected as shown below:

On the Title Page

Item (63) Related U.S. Application Data, Line 2, delete "Jun. 24, 2015" and insert --Jun. 4, 2015--.

Signed and Sealed this
Ninth Day of July, 2019

Andrei Iancu
*Director of the United States Patent and Trademark Office*